Feb. 28, 1956
R. S. JONES
2,736,391
CENTRIFUGAL STRIPPER
Filed Dec. 14, 1953
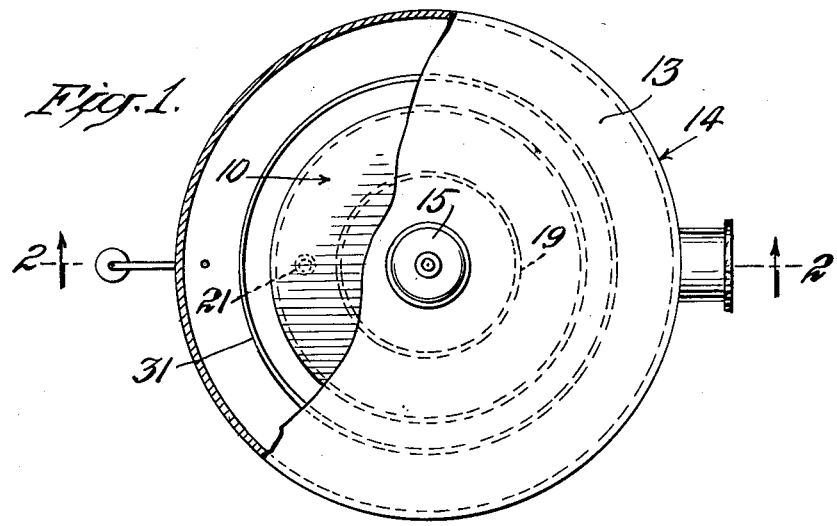
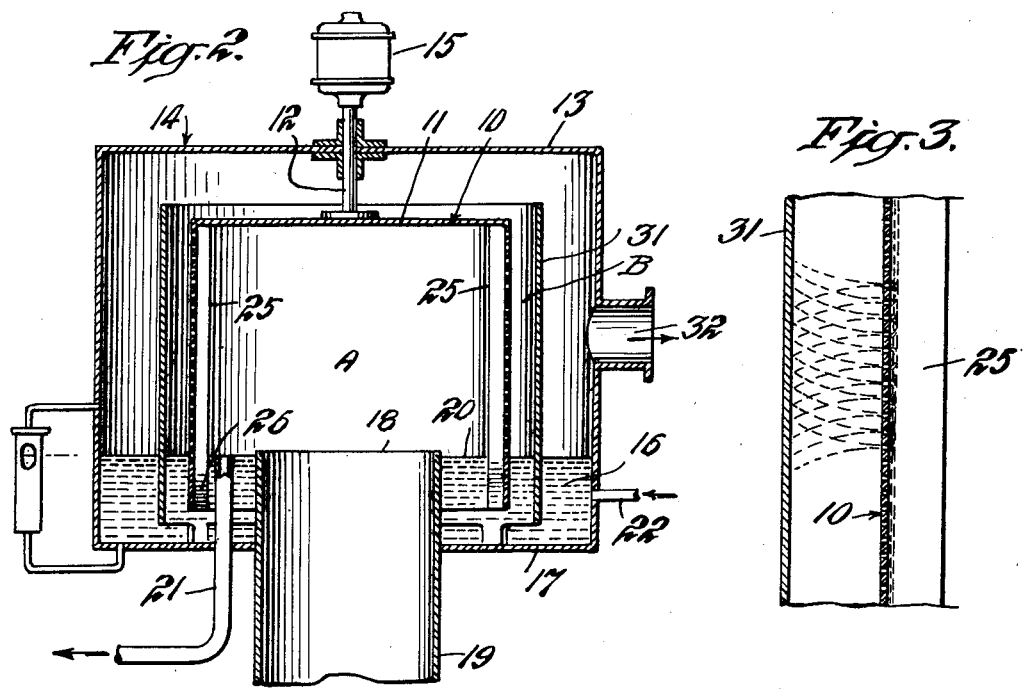
INVENTOR
Richard S. Jones
BY
Frank A. Bower
ATTORNEY

United States Patent Office 2,736,391
Patented Feb. 28, 1956

---

2,736,391

CENTRIFUGAL STRIPPER

Richard S. Jones, Bayside, N. Y., assignor to Donald B. Adams, New York, N. Y.

Application December 14, 1953, Serial No. 397,964

1 Claim. (Cl. 183—26)

This invention relates to the separation out of a gaseous mixture ingredients condensible or absorbable in a liquid film.

The object of the invention is to provide a moving liquid film in contact with the gaseous mixture to gather therefrom the part to be removed while permitting the remaining gases and vapors to pass for collection or further treatment.

A further object of the invention is to provide apparatus forming a liquid film from a body of the liquid and passing the gaseous mixture therethrough for retention of the portions to be separated and release of the remainder.

Other objects of the invention particularly in the structure and operation of a centrifugal separator will appear from the following specification taken in connection with the accompanying drawing in which:

Fig. 1 is a plan view of typical apparatus for treatment of gaseous mixtures in accordance with the invention;

Fig. 2 is a vertical sectional view taken on the line 2—2 of Fig. 1; and

Fig. 3 is an enlarged sectional detail of a portion of Fig. 2.

In the separator shown in the drawing a rotatable cylinder 10 has a closed top 11 by which it is supported by shaft 12 from the roof 13 of casing 14. The shaft 12 may be driven in any desired manner as by motor 15 and the lower end of the cylinder 10 is open and dips below the level of the liquid 16 retained in the bottom 17 of casing 14 and surrounding the upper end 18 of the inlet pipe 19 supplying the gaseous mixture to the cylinder 10.

The liquid 16 is automatically maintained substantially at level 20 by overflow into the discharge 21 and there is a constant supply of the liquid at a predetermined rate through supply pipe 22.

The cylinder 10 is of foraminous material as, for instance, a perforated screen and is channeled on the inside by strips 25 providing pick-up blades 26 at the bottom so that the channeling guides the film elevated across the inner surface of the cylinder by the blades 26 as they are carried around by the rotation of the cylinder.

The gaseous mixture enters at 18 and is confined in the chamber A within the cylinder 10 and above the liquid level 20. As the cylinder rotates its centrifugal action on the gas mixture rotating with it aids in passing the gases outward through the liquid film on the inner cylinder surface and through the screen orifices. This film is at a temperature relatively lower and acting to condense gases or vapors to be removed.

It may also act as a clarifier mixing with the passing gases and absorbing and retaining any dust, smoke or the like.

The liquid film thus contacting with the gaseous mixture spreads over the inner surface of the cylinder 10 and passes out as tiny jets through the cylinder orifices for further intermingling of the liquid and the gaseous mixture, and a baffle cylinder, or the like, such as shown at 31 may be provided, and against this the centrifugal jets spatter and are further broken up (Fig. 3) to drop back into the liquid 16 while the remaining unabsorbed and uncondensed gases pass into the space B around cylinder 10 and within the casing 14 for delivery at discharge 32.

I claim:

In a centrifugal separation an outer casing having means maintaining a constant level liquid pool at the bottom thereof and a gas discharge opening above the level of said pool, a gas inlet pipe opening into the center of said casing above the level of said pool, a stationary baffle open at its upper end and surrounding said inlet opening and adjacent thereto and intervening between said opening and said gas discharge, an annular rotary member surrounding said inlet opening and positioned within said baffle and engaging said liquid pool to draw a film of liquid therefrom and having its upper end closed against escape of fluids and provided with peripheral perforations below the level of the top of said baffle, and means for rotating said member to discharge a mixture of liquid and gases through said perforations and against said baffle acting to separate said liquid and gases with release of gases at the said upper end of said baffle and downward flow and discharge of liquid along said baffle into said constant level pool, the released gases passing out through said discharge opening in said casing.

References Cited in the file of this patent

UNITED STATES PATENTS

| | | |
|---|---|---|
| 940,103 | Feld | Nov. 16, 1909 |

FOREIGN PATENTS

| | | |
|---|---|---|
| 126,226 | Austria | Jan. 11, 1932 |
| 294,680 | Great Britain | July 30, 1928 |